(12) United States Patent
Howes et al.

(10) Patent No.: US 10,298,134 B1
(45) Date of Patent: May 21, 2019

(54) SWITCHING CONVERTER SOFT START METHOD USING SCALED SWITCH SIZE

(71) Applicant: Dialog Semiconductor (UK) Limited, London (GB)

(72) Inventors: Rupert Howes, Stroud (GB); Ambreesh Bhattad, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/925,124

(22) Filed: Mar. 19, 2018

(51) Int. Cl.
| | |
|---|---|
| *H02M 3/158* | (2006.01) |
| *H02M 1/32* | (2007.01) |
| *H02H 7/12* | (2006.01) |
| *H02M 1/00* | (2006.01) |
| *H02M 1/38* | (2007.01) |

(52) U.S. Cl.
CPC ........ *H02M 3/1588* (2013.01); *H02H 7/1213* (2013.01); *H02M 1/32* (2013.01); *H02M 1/38* (2013.01); *H02M 2001/0009* (2013.01); *H02M 2001/0045* (2013.01)

(58) Field of Classification Search
CPC . H02M 2001/0048; H02M 2001/0054; H02M 3/158; H02M 3/1584; H02M 3/1588; H02M 1/32

See application file for complete search history.

(56) References Cited

U.S. PATENT DOCUMENTS

| | | | |
|---|---|---|---|
| 5,132,606 A | 7/1992 | Herbert | |
| 6,304,460 B1 | 10/2001 | Cuk | |
| 6,563,293 B2 * | 5/2003 | Marino | ............... H02M 3/1584 323/272 |
| 6,930,473 B2 * | 8/2005 | Elbanhawy | ......... H02M 3/1584 323/282 |
| 2005/0110559 A1 | 5/2005 | Farkas et al. | |

* cited by examiner

*Primary Examiner* — Gary L Laxton
(74) *Attorney, Agent, or Firm* — Saile Ackerman LLC; Stephen B. Ackerman

(57) ABSTRACT

A DC-DC switching converter soft start method is provided, using a scaled switch size. An increased switch resistance, higher than the normal operating switch resistance, is achieved during the startup of the switching converter. The on-resistance of the high side switch, together with a minimum duty cycle, reduces the peak inductor current of the switching converter. After a startup period, the switching converter reverts back to a normal switch resistance.

21 Claims, 10 Drawing Sheets

SWITCHING CONVERTER SOFT START METHOD USING SCALED SWITCH SIZE

BACKGROUND

Field

The disclosure relates generally to the startup of a DC-DC switching converter, and limiting the ramp rate of the coil current.

Background

At the initial startup of a DC-DC switching converter, when the high side switch is enabled, the voltage across the inductor may be large, if the output voltage is at zero. This voltage is equal to the input voltage of the switching converter. The coil current then ramps up at a rate determined by the voltage across the coil, the input voltage–the output voltage, and the inductance of the coil and to first order is:

$$di/dt = (V\text{in} - V\text{out})/L$$

This rate of change of inductor current will be large especially for small coil values. The peak coil current is then determined by di/dt, and the on time of the high-side switch duty cycle. To keep the peak coil current within safe operating limits of the inductor and high-side switch, the duty cycle needs to be limited. In addition, the di/dt needs to be limited to prevent excessive voltage drop induced across the power supply lines' parasitic inductance. Once the switching converter output voltage has reached the target value, the rate of change of inductor current reduces to its predetermined output stage operating region, since the input voltage minus the output voltage becomes smaller.

Various methods have been employed to limit the peak coil current at the initial startup. In most of these methods, the on time of the high-side switch duty cycle is controlled by ramping up the reference voltage of the control loop from zero to the steady state value. This may be done either with an analog control, by using a current source to charge a capacitor, or with a digital control by using a DAC to control the reference voltage directly. By gradually ramping up the reference voltage, the duty cycle is gradually increased. Initially the duty cycle will be set to the minimum value, which in reality cannot be zero but is limited to a minimum on-time, determined by the response time of the control circuitry and technology limitations. Therefore, with the minimum on-time and minimum reference voltage, the peak coil current is determined as:

$$I = t\text{minon}(V\text{in} - V\text{out})/L$$

For a given tminon determined by technology limitations, the peak coil current cannot be reduced further. For small values of inductance, the coil current may still become excessive and exceed the component limits, such as inductor saturation current or electromigration. Therefore this approach does not meet the requirements, and an alternative method of limiting the peak coil current is required.

SUMMARY

An object of the disclosure is to provide a DC-DC switching converter, which limits peak coil current at startup.

A further object of the disclosure is to keep peak coil current within safe operating limits of the inductor and/or the high-side switch of the switching converter.

Still further, another object of the disclosure is to limit the rate of change of the inductor current, to prevent excessive voltage drop induced across the parasitic inductance of power supply lines.

To accomplish the above and other objects, a DC-DC switching converter is disclosed, comprising a full size device output stage, further comprising an inductor, a capacitor, a high side switch, and a low side switch. The DC-DC switching converter further comprises a multi-segment switching stage, configured to add high side switches and low side switches in parallel to the output stage. The DC-DC switching converter further comprises a scaled high side switch of the multi-segment switching stage, configured to increase an on-resistance during a startup of the switching converter.

The above and other objects are further achieved by a method for a DC-DC switching converter soft start, using a scaled switch size. The steps include during a startup period of the switching converter, using one or more scaled devices to increase an on-resistance of a device driving a current at an output of the switching converter. The steps also include after the startup period of the switching converter is complete, switching in a full size device output stage, comprising a high side switch and a low side switch, to drive the current at the output of the switching converter.

In various embodiments the function may be achieved using a Buck, Boost, or Buck-Boost DC-DC switching converter.

In various embodiments the function may be achieved using a voltage mode switching converter.

In various embodiments the function may be achieved using a current mode switching converter.

In various embodiments the function may be achieved using a PMOS high side switch.

In various embodiments the function may be achieved using a NMOS low side switch.

In various embodiments the function may be achieved using a multi-segment switching stage configured to reduce a total on-resistance of the switching converter.

In various embodiments the function may be achieved using a multi-segment switching stage configured to rotate through the high side switches.

In various embodiments the function may be achieved using a multi-segment switching stage configured to a non-overlapping condition of the high side switches and the low side switches.

DETAILED DESCRIPTION

The present disclosure provides a solution to both peak coil current and rate of change of inductor current issues, using a DC-DC switching converter with a minimum duty cycle. The disclosure provides a di/dt limitation by using a scaled switch resistance size, preventing current overshoot by controlling the input current, with a smooth, controlled, or variable start-up.

Figure 1:
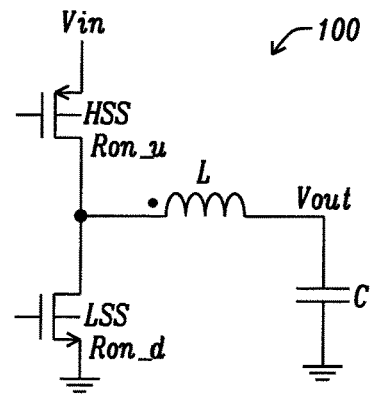
FIG. 1 illustrates a generalized output stage of a DC-DC switching converter.

FIG. 1 illustrates generalized output stage 100 of a DC-DC switching converter. The output stage consists of inductor L, capacitor C, high side switch HSS and low side switch LSS. The inductor is configured at the output of the high side switch, and low side switch, and provides output voltage VOUT. The high side switch resistance is denoted by Ron_u, and the low side switch resistance is denoted by Ron_d. VIN is applied to the drain of the high side switch, and VOUT is shown across the capacitor C and GND.

Figure 2:
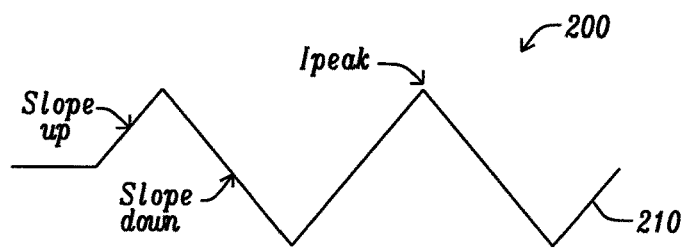
FIG. 2 shows a steady state waveform of the inductor current of the output stage of a DC-DC switching converter.

FIG. 2 shows steady state waveform 200 of the inductor current of the output stage of a DC-DC switching converter, in continuous conduction mode. Inductor current 210 slopes up during the on-time of the high side switch, and slopes down during the on-time of the low side switch. The on and off-times of HSS and LSS are determined by the required duty cycle D, which is typically generated by a control circuit of the switching converter. The slope of the inductor current is determined by the following simplified relationship:

$$di/dt=(Vin-Vout)/L$$

The above equation indicates an approximately constant slope, assuming VOUT does not change significantly during the on-time period. Ipeak indicates the peak inductor current of the output stage of the switching converter.

Figure 3:
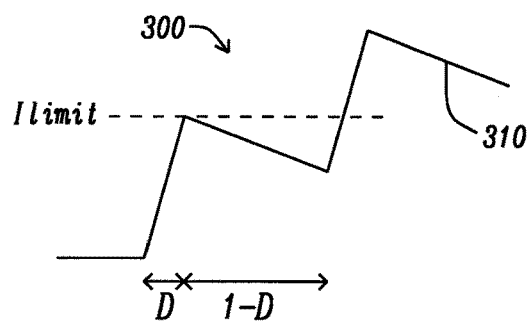
FIG. 3 shows a simplified representation of the inductor current at the startup of a DC-DC switching converter.

FIG. 3 shows simplified representation 300 of the inductor current at the startup of a DC-DC switching converter. During startup, when VOUT=0, the slope will be large and can lead to large values of inductor current. To prevent inductor current 310 exceeding a safe limit during the initial startup, it is common to employ a form of current limit control which limits duty cycle D, and turns off the high side switch should current limit level Ilimit be exceeded. Various mechanisms have been employed to limit the duty cycle, to keep the peak inductor current below the maximum limit, for example ramping up the reference voltage. Because the duty cycle can only be reduced to a finite minimum value, there exists a finite minimum peak inductor current than can be achieved, determined by the up-slope of the current and the minimum on-time of HSS.

Figure 4:
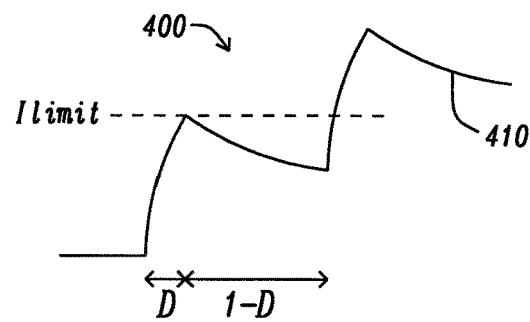
FIG. 4 shows a more accurate representation of the inductor current at the startup of a DC-DC switching converter.

FIG. 4 shows more accurate representation 400 of the inductor current at the startup of a DC-DC switching converter. Here the inductor current slope takes into account the on-resistance of the high side switch, Ron_u, and dc resistance DCR of the inductor:

$$di/dt=(Vin-Vout)/L-I(Ron\_u+DCR)/L$$

In the equation above, VIN represents the input voltage, VOUT the output voltage, and inductor L current I, of the output stage of the switching converter. Note that the inductor current slope decreases, as the inductor current builds up.

Figure 5A:
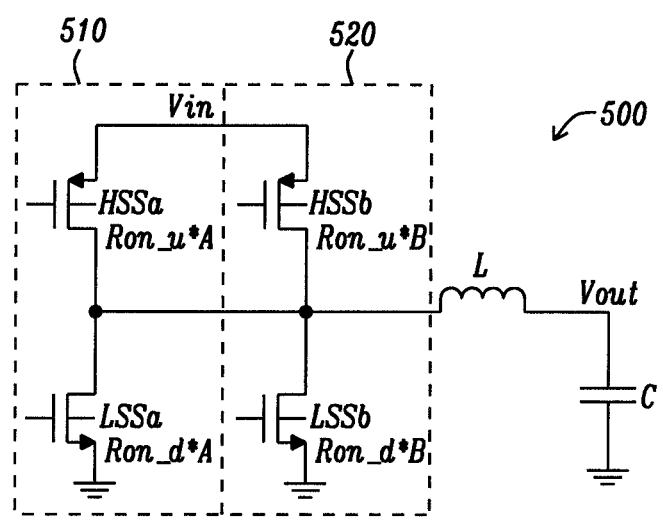
FIG. 5A illustrates an implementation of the proposed soft-start mechanism circuit, where the peak inductor current is reduced using a scaled switch.

FIG. 5A illustrates a preferred embodiment 500 of the proposed soft-start mechanism circuit, where the peak inductor current is reduced using a scaled switch. While operating at the minimum duty cycle, the peak inductor current can be reduced by temporarily increasing the value of the on-resistance of the high side switch Ron_u, achieved by using a scaled switch size. One implementation of such a scheme is shown, where HSSa and/or HSSb operate to provide the High Side Switch function, and LSSa and/or LSSb operate to provide the Low Side Switch function. HSSa and LSSa, in scaled device stage 510, are smaller devices than HSSb and LSSb, in output stage 520, and thus have a higher on-resistance.

High side switches HSSa and HSSb may be PMOS type, and have their sources at input voltage VIN, and their drains at one end of the inductor. High side switches HSSa and HSSb have switching resistances Ron_u*A and Ron_u*B, respectively.

Low side switches LSSa and LSSb may be NMOS type, and have their sources at GND, and their drains at one end of the inductor. Low side switches LSSa and LSSb have switching resistances Ron_d*A and Ron_d*B, respectively.

During startup, only one HSS and one LSS are used for example HSSa/LSSa, creating a higher resistance size Ron_u*A and Ron_d*A. The proposed soft-start mechanism circuit reverts back to a full size device and predetermined output stage switch resistance Ron_u*B and Ron_d*B, after the startup period. Alternatively, both the scaled switches HSSa/LSSa and HSSb/LSSb can operate after startup.

Figure 5B:
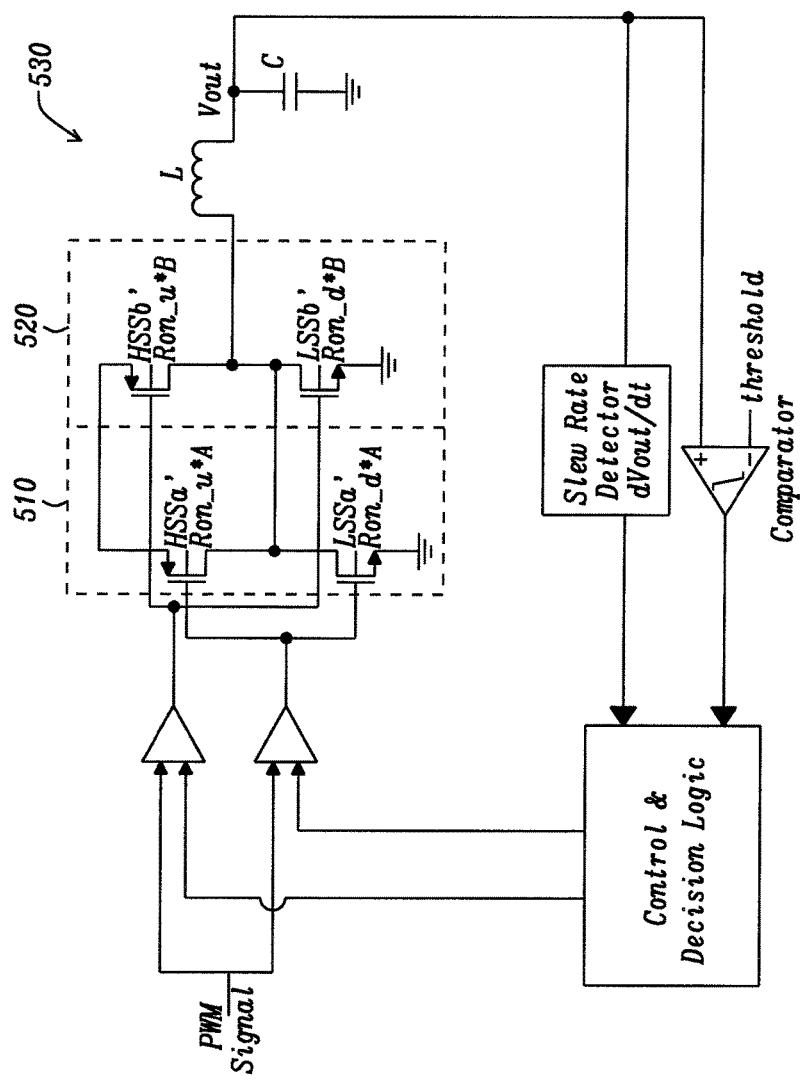
FIG. 5B illustrates a control circuit diagram, showing how scaled size switches in the scaled device stage are used at startup, and how the full size device output stage is operated after startup.

FIG. 5B illustrates control circuit diagram 530, showing how HSSa and LSSa, in scaled device stage 510 of FIG. 5A, are used at startup, and how full size device output stage 520 is operated after startup. DVout/dt is monitored by a slew rate detector circuit, to determine when the Vout slew rate has settled. In addition, a comparator is used to determine the absolute Vout level. The status of the output of these two circuits is used by control & decision logic to enable or disable a driver stage circuit for each switch segment. Initially when Vout=0, the comparator output will be 0, so the control logic enables only the scaled switches of scaled device stage 510. Then Vout will start to rise, and the slew rate detector will indicate this. Once the slew rate reduces, the control logic uses this information to disable the scaled switches, and to enable the full size switches of device stage 520. Alternatively, the scaled switches remain in the circuit, and the full size switches are enabled in addition to them. The control & decision logic ensures synchronization with the PWM signal.

Figure 6:
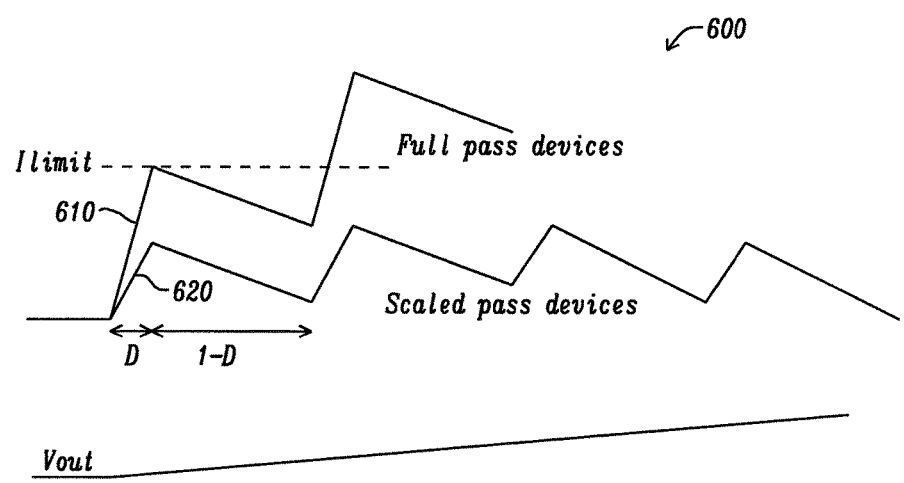
FIG. 6 shows the effect of increasing the switch resistance on the inductor current slope and peak current of a DC-DC switching converter.

FIG. 6 shows effect 600 of increasing the switch resistance, on the inductor current slope and peak current, of a DC-DC switching converter. The scaled pass devices of the disclosure, HSSa/LSSa, create a higher resistance, Ron_u*A and Ron_d*A. This leads to lower inductive current slope 620, when compared to using full size pass devices 610, and therefore a lower peak current during the minimum on-time of the high side device, with output voltage VOUT. To prevent the inductor current exceeding safe limit Ilimit during initial startup, current control logic limits duty cycle D.

Figure 7:
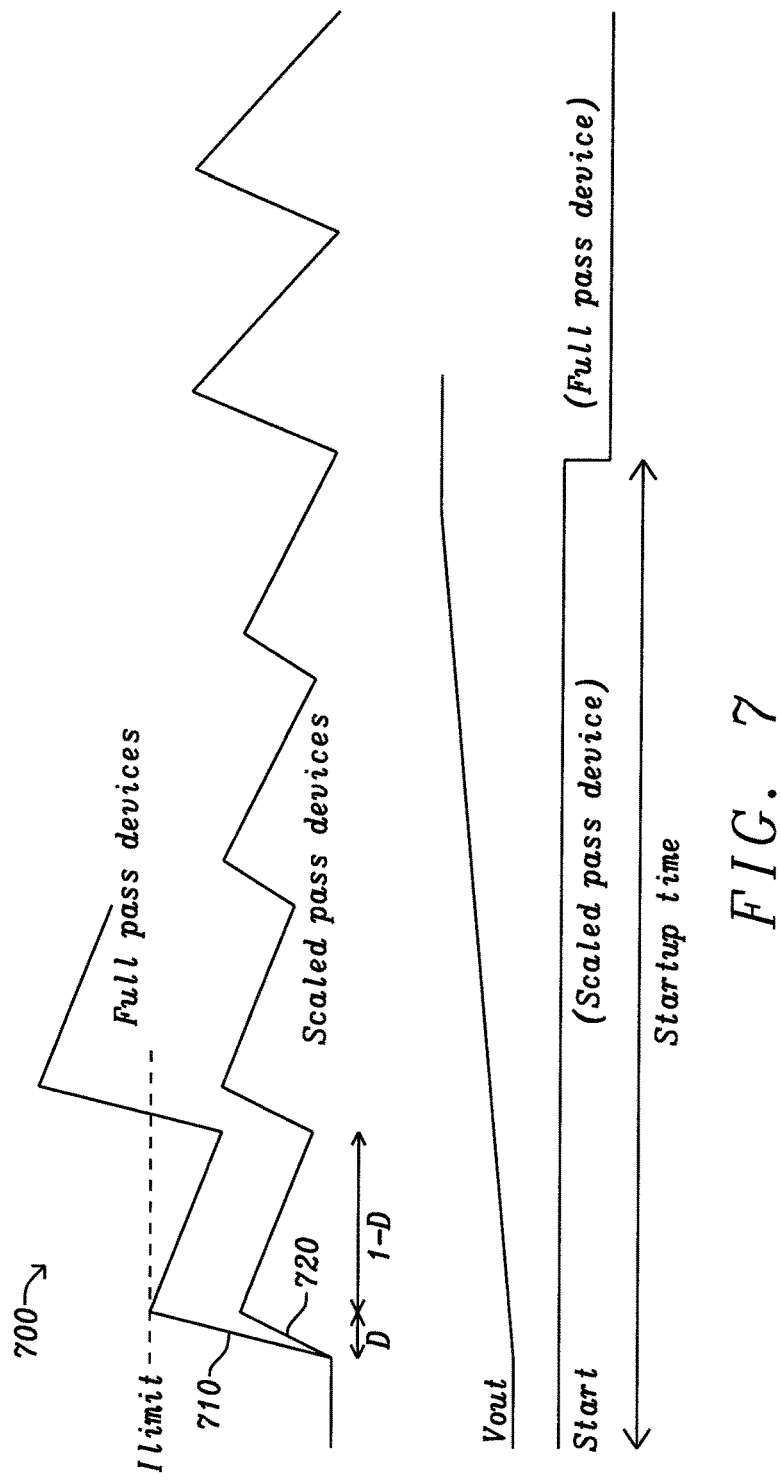
FIG. 7 shows a comparison of the inductor current startup behavior both with and without the proposed soft-start mechanism.

FIG. 7 shows comparison 700 of the inductor current startup behavior both with and without the proposed soft-start mechanism. Again, with the scaled pass devices of the disclosure creating a higher resistance Ron_u*A and Ron_d*A, inductive current slope 720 is lower, when compared to using full size pass devices 710. This results in a lower peak current during the minimum on-time of the high side device, controlled by duty cycle D. After the startup time during which scaled pass devices are used, and VOUT has reached the required level, full pass devices are then used to allow normal operation.

In addition, the scaled low side switches may be used during startup to reduce the down slope of the coil current, ensuring the coil current doesn't decrease too much. If a full size, low side switch were used as the coil current ramps down, the down slope of the current would be large, and the net change in the coil current over a switching cycle would be very small or zero. The net output current to charge the output voltage would also be very small or zero, such that Vout would not increase to the required level.

Figure 8:
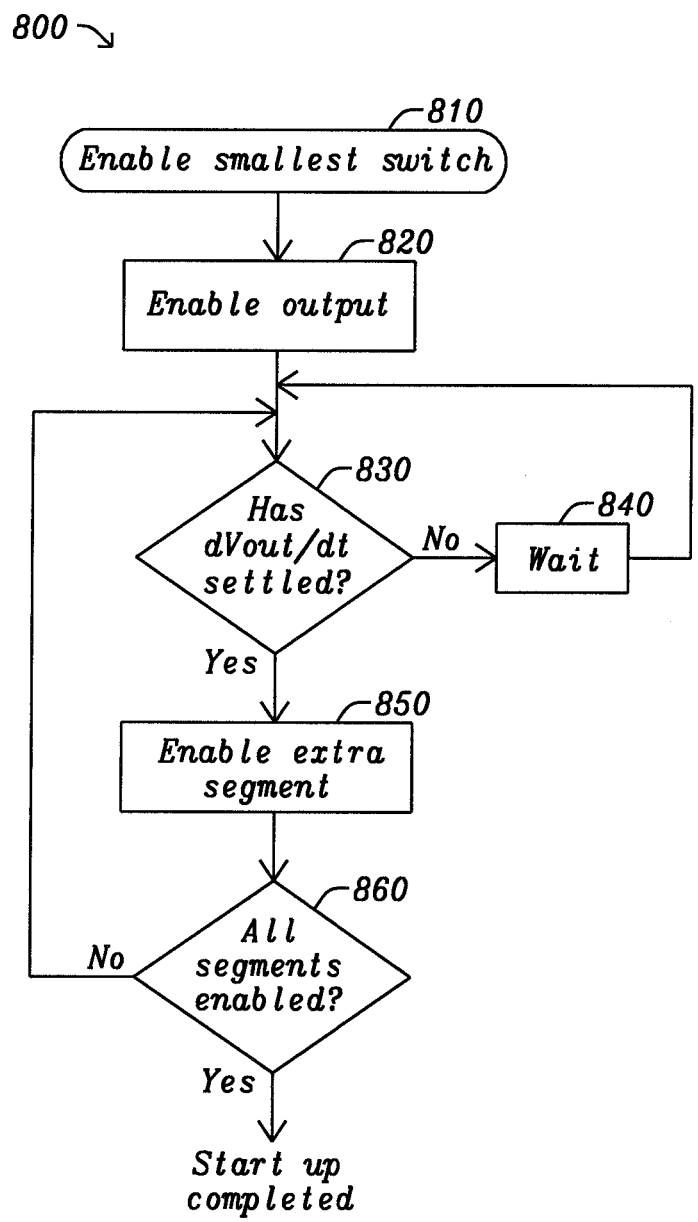
FIG. 8 illustrates a flowchart of the sequence of operations for the proposed soft-start mechanism.

FIG. 8 illustrates flowchart 800 of the sequence of operations for the proposed soft-start mechanism. The sequence of operations for the proposed soft start mechanism is described as follows. In 810, the smallest switch is enabled. In 820, the output is enabled. In 830, dVout/dt is checked to see if it has settled. If dVout/dt has not settled, there is a wait time in 840. If dVout/dt has settled, an extra segment is switched in, if more than one scaled device stage is used in 850. In 860, if all segments are not switched in, dVout/dt is checked again. If all segments are switched in, start up is completed. To minimize the startup delay, regular sampling of the VOUT level is required, so that extra segments are switched in, as the output voltage settles.

Figure 9:
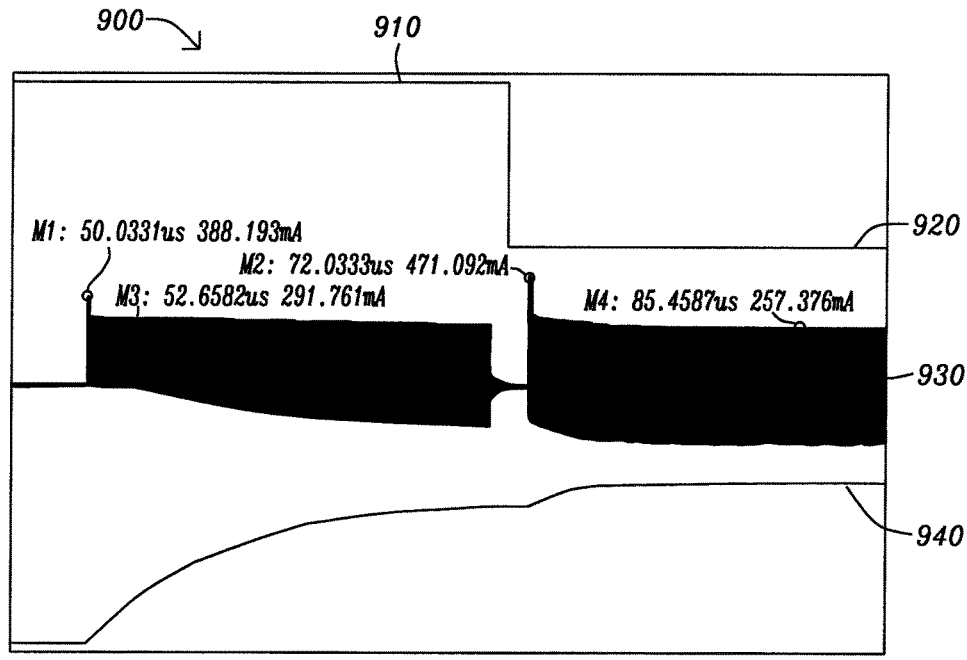
FIG. 9 shows a startup simulation, with the soft-start mechanism enabled, using scaled-down switches.

FIG. 9 shows startup simulation 900, with the soft-start mechanism enabled, using scaled-down switches. Waveform 910 shows startup with scaled-down switches initially, while waveform 920 shows switching with full size switches once output voltage 940 has settled. During startup the use of the scaled-down switches, with increased resistance, leads to lower inductive current slope as can be seen in waveform 930. This is compared to using full size pass devices, with decreased resistance. In this simulation, the output stage is disabled for a short period when the full size switches are configured, although this is not a requirement of the disclosure.

Figure 10:
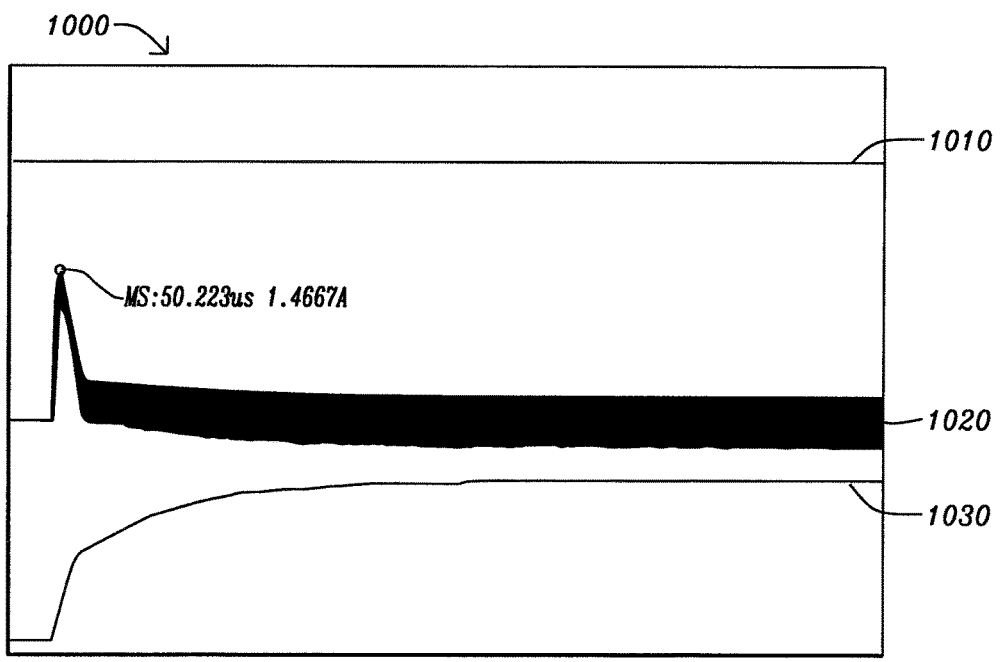
FIG. 10 shows a startup simulation without the soft-start mechanism enabled, using full size switch resistance.

FIG. 10 shows startup simulation 1000 without the soft-start mechanism enabled, using full size switch resistance. Waveform 1010 shows using full size switches from the beginning, where output voltage is represented in 1030. The use of the full size switches, with decreased resistance, does not result in lower inductive current slope, and the peak current in 1020 is unchanged.

By increasing the effective switch resistance on startup, the power dissipation in the scaled switch is increased. Steps need to be taken to ensure this does not cause reliability or lifetime issues. Because the scaled switch is operated in this startup mode only for a short time, the impact on the device lifetime is minimized. Also, a method of mitigating the potential reliability issue in a multi-segment switching stage is to rotate through the multiple segments to ensure they are stressed similarly.

In another use case the switching converter output may already be loaded, for example in a multiphase converter, drawing more current than can be provided by a scaled segment switching stage. In this case the output voltage may not increase to the expected level, and the decision is made based on the output voltage rate of change, whether to add in extra segments to boost the drive. Therefore, control scheme in FIG. 8 monitors the rate of change of Vout, dVout/dt, rather than absolute Vout.

The current limit is a function of input voltage if the on-time is set to a minimum. Therefore, the maximum coil current occurs when the input voltage is also a maximum. If the variation of input voltage is large, the number of segments used at startup could be made a function of input voltage so as to further control the input inrush current.

Note the startup system is applicable to both voltage mode and current mode switching converters. Although current mode switching converters have current limit control loop logic built in, this will suffer from the same startup issue where the minimum peak coil current is determined by the minimum on-time, as described above. By implementing the switching stage as several parallel segments during startup, in operation these segments must now be driven together. One potential issue that may arise is cross conduction from the high side switch of one segment to the low side switch of another segment if the driving logic is not properly aligned. Therefore the driving logic must ensure a correct non-overlap control function of the multiple segments.

This variation of the disclosure, to use multiple switch segments and gradually add more switches in parallel, reduces the total on-resistance of the switches. The total number of segments is arbitrary, as is the resistance size of each one. For example, a 4-segment stage could employ equal segments, 4×¼, or unequal segments, such as ½, ¼, ⅛, ⅛.

Figure 11A:
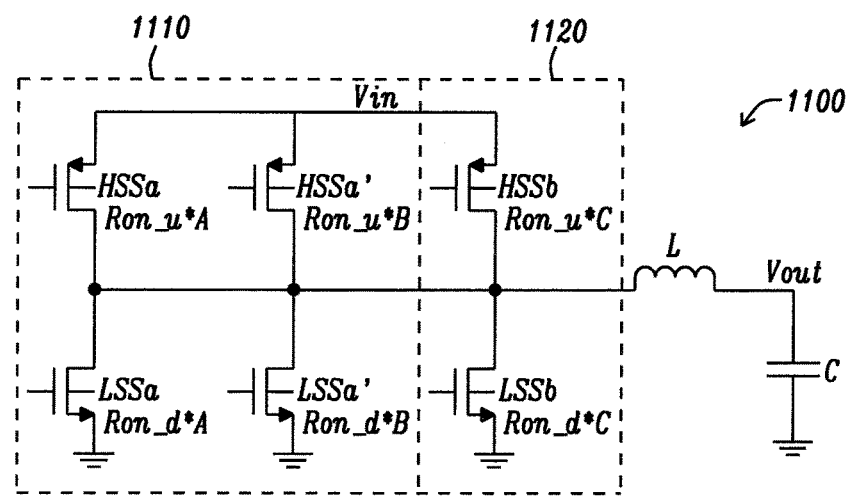
FIG. 11A gives a variation of the proposed soft-start mechanism circuit, using three scaled-down switch segments.

FIG. 11A gives variation 1100 of the proposed soft-start mechanism circuit, using two scaled-down switch segments. On the high side, the two scaled-down switch segments are labeled HSSa and HSSa', respectively. Note that 3, 4, or more segments could also be used. While operating at the minimum duty cycle, the peak inductor current can be reduced by temporarily increasing the value of the on-resistance of the high side switch Ron_u, using a scaled switch size initially. One possible implementation of such a scheme is shown, where HSSa, HSSa', and HSSb operate to provide the High Side Switch function, and LSSa, LSSa', and LSSb operate to provide the Low Side Switch function. During startup only one HSS and one LSS is used, for example left most HSSa/LSSa, creating a higher resistance Ron_u*A and Ron_d*A. HSSa/HSSa' and LSSa/LSSa', in scaled device stage 1110, are smaller devices than HSSb and LSSb, in output stage 1120, and thus have a higher on-resistance.

High side switches HSSa, HSSa', and HSSb typically are PMOS type, and have their sources at input voltage VIN, and their drains at one end of the inductor. High side switches HSSa, HSSa', and HSSb have switching resistances Ron_u*A, Ron_u*B, and Ron_u*C respectively.

Low side switches LSSa, LSSa', and LSSb typically are NMOS type, and have their sources at GND, and their drains at one end of the inductor. Low side switches LSSa, LSSa', and LSSb have switching resistances Ron_d*A and Ron_d*B, and Ron_d*C respectively.

The proposed soft-start mechanism circuit may revert back to a full size switch resistance, first with Ron_u*B and Ron_d*B after the startup period, and then with Ron_u*C and Ron_d*C, gradually reducing the total on-resistance of the switches.

Figure 11B:
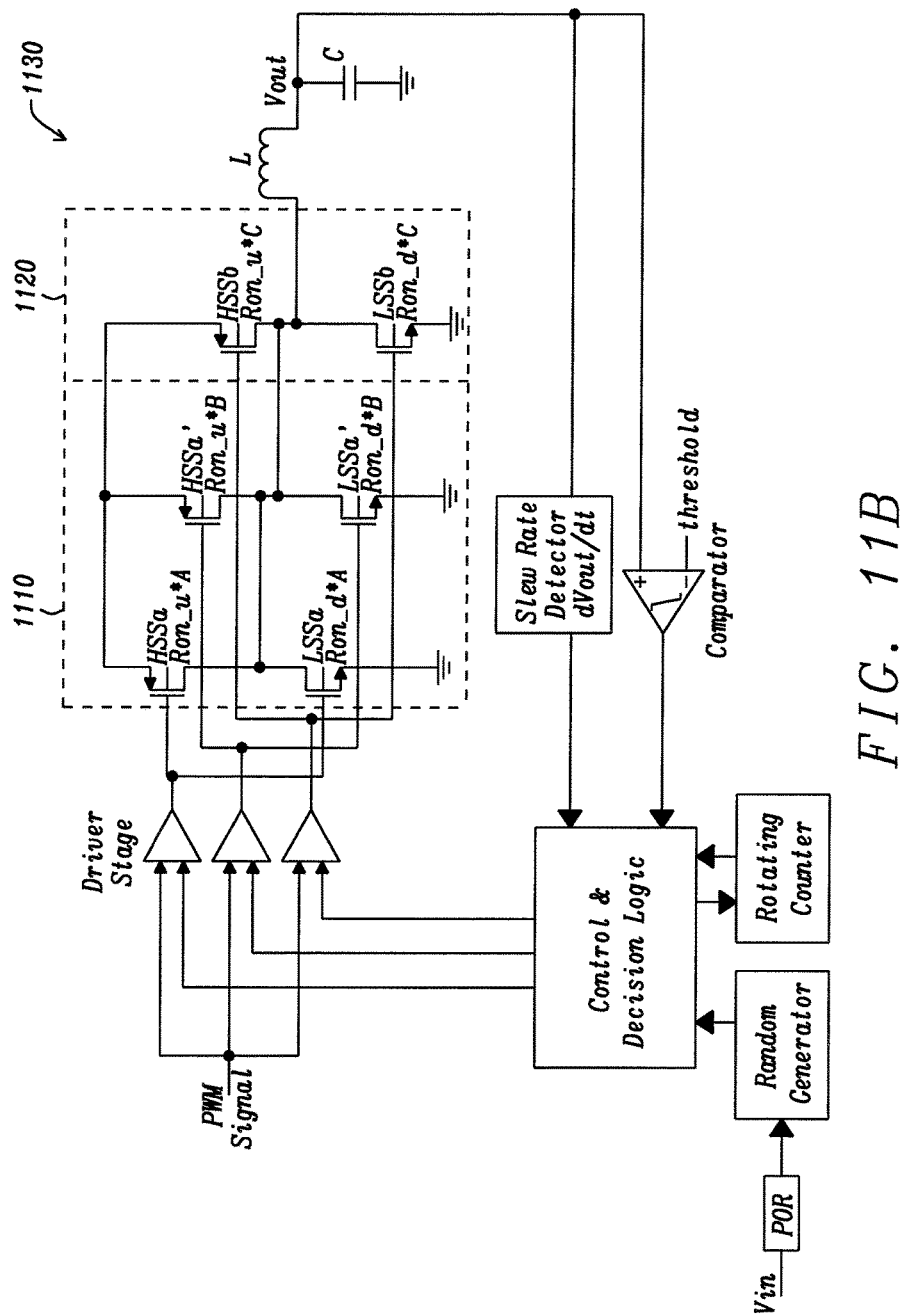
FIG. 11B is a circuit diagram showing rotation through different segments of a multi-segment switching stage for improved reliability.

FIG. 11B is circuit diagram 1130, showing rotation through different segments of a multi-segment switching stage for improved reliability. The circuit rotates through different segments over the course of sequential startup events, so that the same segment is not used every time. When Vin power is first supplied, a power on reset circuit (POR) is used to trigger a random signal generator, to provide a selection code for the segment to be used. If the Vin power supply is already present, and only Vout needs to be started, a rotating counter circuit is used to cycle through segments used at the next startup. The control and decision logic will toggle the counter every time Vout startup is required. Use of these two mechanisms provides equal distribution of startup segments, thus improving reliability.

Figure 11C:
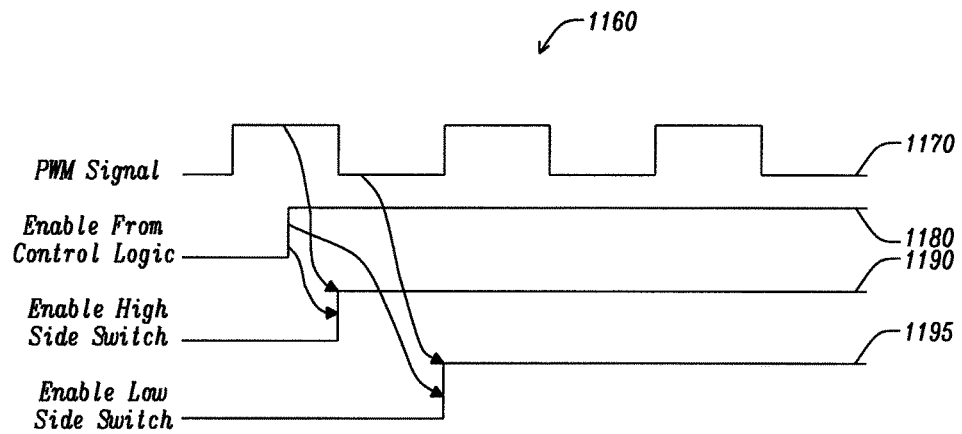
FIG. 11C is a timing diagram showing the non-overlapping control function of multiple segments of scaled-down switches.

FIG. 11C is timing diagram 1160, showing the non-overlapping control function of multiple segments of scaled-down switches. A control mechanism is used when enabling an additional segment of switches. When asynchronous enable signal 1180 is generated by the control logic, in general it will not be synchronized with PWM signal 1170. The timing diagram shows how synchronization is accomplished. At the rising edge of the enable signal, the logic state of the PWM signal is determined (logic high in this example). At the next edge of the PWM signal (falling in this example), enable signal 1190 is generated for the high side switch. At the next PWM edge (rising in this example), enable signal 1195 is generated for the low side switch. This mechanism ensures that the high side and low side switches are not enabled part way through their switching cycle.

Figure 12:
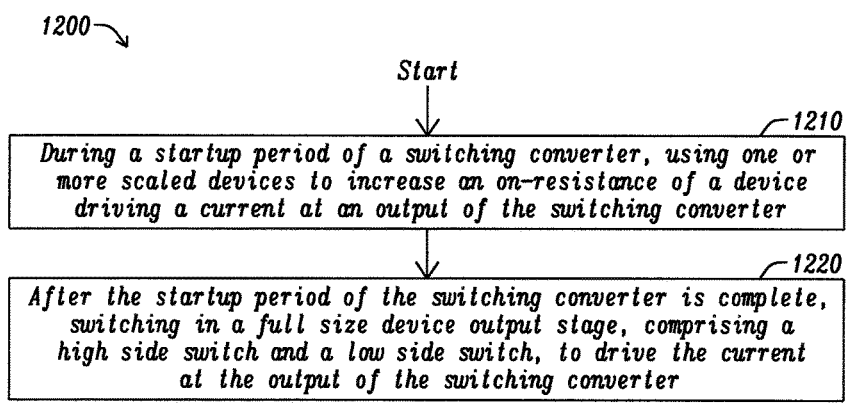
FIG. 12 is a flow chart of a method for a DC-DC switching converter soft-start, using a scaled switch resistance size.

FIG. 12 is flow chart 1200 of a method for a DC-DC switching converter soft start, using a scaled switch resistance size. The steps include 1210, during a startup period of the switching converter, using one or more scaled devices to increase an on-resistance of a device driving a current at an output of the switching converter. The steps also include 1220, after the startup period of the switching converter is complete, switching in a full size device output stage, comprising a high side switch and a low side switch, to drive the current at the output of the switching converter.

The advantages of one or more embodiments of the present disclosure include allowing the control of both the peak inductor current and the rate of change of the inductor current simultaneously, in a DC-DC switching converter.

While this invention has been particularly shown and described with reference to the preferred embodiments thereof, it will be understood by those skilled in the art that various changes in form and details may be made without departing from the spirit and scope of the invention.

The invention claimed is:

1. A DC-DC switching converter, comprising:
   An output stage, comprising:
   a high side switch, a low side switch, and a slew rate detector; and
   a scaled device switching stage configured to include one or more high side switches and low side switches in parallel to said output stage,
      wherein said scaled device switching stage comprises at least one scaled high side switch, configured to increase an on-resistance during a startup period of said switching converter; and
   wherein said slew rate detector is configured to monitor a chance in an output voltage of said output stage and to determine when said output voltage has settled.

2. The DC-DC switching converter of claim 1, wherein said scaled high side switch is smaller than said output stage high side switch.

3. The DC-DC switching converter of claim 1, wherein said scaled high side switch has a higher on-resistance than said output stage high side switch.

4. The DC-DC switching converter of claim 1, comprising one scaled high side switch, configured to increase an on-resistance during said startup period of said switching converter.

5. The DC-DC switching converter of claim 1, comprising two or more scaled high side switches, configured to increase an on-resistance during said startup period of said switching converter.

6. The DC-DC switching converter of claim 1, further comprising control and decision logic to enable or disable a driver stage circuit for each of said scaled device switching stages or said output stage.

7. The DC-DC switching converter of claim 1, wherein said switching converter is configured to revert to a predetermined on-resistance after said startup period.

8. The DC-DC switching converter of claim 1, wherein said scaled device switching stage comprises two or more high side switches and low side switches, and wherein said DC-DC switching converter is configured to rotate through said high side switches over a course of sequential startups, so that a same high side switch is not used during every startup period.

9. The DC-DC switching converter of claim 1, wherein said scaled device switching stage is configured to be used during said startup period and then disabled, and said output-stage is configured to be enabled after said startup period.

10. The DC-DC switching converter of claim 1, wherein said scaled device switching stage is configured to be used during said startup period and remains enabled, when said output stage is configured to be enabled after said startup period.

11. The DC-DC switching converter of claim 1, wherein said scaled device switching stage is configured to prevent cross conduction of a high side switch of one scaled device switching stage to a low side switch of another scaled device switching stage, to ensure a non-overlap control function of the scaled device switching stages.

12. The DC-DC switching converter of claim 1, wherein said DC-DC switching converter is a Buck, Boost, or Buck-Boost DC-DC type switching converter.

13. The DC-DC switching converter of claim 1, wherein said switching converter is a voltage mode control switching converter.

14. The DC-DC switching converter of claim 1, wherein said switching converter is a current mode control switching converter.

15. The DC-DC switching converter of claim 1, wherein said high side switch is a PMOS device and said low side switch is a NMOS device.

16. A method for a DC-DC switching converter soft start, comprising the steps of:
   during a startup period of said switching converter, using one or more scaled devices to increase an on-resistance of a device driving a current at an output of said switching converter;
   after said startup period of said switching converter is complete, switching in a full size device output stage, comprising a high side switch and a low side switch, to drive said current at said output of said switching converter; and monitoring a change in a voltage of said output of said switching converter to determine when said voltage has settled, using a slew rate detector.

17. The method of claim 16, wherein said switching converter reverts to a predetermined on-resistance after said startup period.

18. The method of claim 16, wherein one or more said scaled devices rotate over a course of sequential startup periods, so that a same scaled device is not used every startup period.

19. The method of claim 16, wherein said one or more scaled devices enable at said startup period and then disable, when said full size device output stage enables after said startup period.

20. The method of claim 16, wherein said one or more scaled devices enable at said startup period and remain enabled, when said full size device output stage enables after said startup period.

21. The method of claim 16, wherein said switching converter prevents cross conduction of a high side switch of one scaled device to a low side switch of another scaled device, ensuring a non-overlap control function of the scaled devices.

* * * * *